United States Patent
Xu

(10) Patent No.: US 10,459,912 B2
(45) Date of Patent: Oct. 29, 2019

(54) OPTIMIZING PROCESSING OF GROUP-BY QUERIES FEATURING MAXIMUM OR MINIMUM EQUALITY CONDITIONS IN A PARALLEL PROCESSING SYSTEM

(75) Inventor: Yu Xu, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 41 days.

(21) Appl. No.: 13/446,048

(22) Filed: Apr. 13, 2012

(65) Prior Publication Data

US 2012/0197866 A1 Aug. 2, 2012

Related U.S. Application Data

(63) Continuation-in-part of application No. 12/332,602, filed on Dec. 11, 2008, now Pat. No. 8,234,292, and a continuation of application No. 12/491,312, filed on Jun. 25, 2009, now abandoned.

(51) Int. Cl.
| | |
|---|---|
| G06F 7/00 | (2006.01) |
| G06F 16/242 | (2019.01) |
| G06F 16/2458 | (2019.01) |
| G06F 16/2453 | (2019.01) |

(52) U.S. Cl.
CPC ........ G06F 16/244 (2019.01); G06F 16/2465 (2019.01); G06F 16/24532 (2019.01)

(58) Field of Classification Search
CPC .... G06F 17/27; G06F 17/30; G06F 17/30445; G06F 17/30539; G06F 16/244; G06F 16/2465; G06F 16/24532

USPC .......................................... 707/713, 718, 764
See application file for complete search history.

(56) References Cited

U.S. PATENT DOCUMENTS

| | | | |
|---|---|---|---|
| 5,511,190 A * | 4/1996 | Sharma ............. | G06F 16/24556 |
| 5,655,080 A * | 8/1997 | Dias ...................... | G06F 9/5027 709/202 |
| 7,319,997 B1 * | 1/2008 | Morris et al. ................. | 707/714 |

* cited by examiner

*Primary Examiner* — Tony Mahmoudi
*Assistant Examiner* — Michael Le
(74) *Attorney, Agent, or Firm* — Ramin Mahboubian; James Stover

(57) ABSTRACT

A system, method, and computer-readable medium for optimized processing of queries that feature maximum or minimum equality conditions are provided. The disclosed mechanisms provide for a single-scan of the table on which the group-by query is applied. When the table is scanned, each processing module dynamically keeps track of the row(s) having a value of the attribute on which the equality condition is applied that equals or exceeds the maximum attribute value (assuming a maximum equality condition is applied) previously encountered by the processing module. Subsequently, a global aggregation process is then performed to compute the query's result without rescanning the table. Queries featuring a minimum equality condition are similarly processed in accordance with the disclosed embodiments.

16 Claims, 7 Drawing Sheets

500 ⟶

Transactions
{ 520
| | 520a | 520b | 520c |
|---|---|---|---|
| | Cashier_ID | Transaction_ID | Sales_Amount |
| 510a- | 56789 | 11111 | 127.34 |
| 510b- | 12345 | 22222 | 268.45 |
| 510c- | 56789 | 33333 | 810.25 |
| 510d- | 34343 | 44444 | 67.10 |
| 510e- | 12345 | 55555 | 325.00 |
| 510f- | 56565 | 66666 | 127.48 |
| 510g- | 12345 | 77777 | 345.67 |
| 510h- | 56789 | 88888 | 543.21 |
| 510i- | 34343 | 99999 | 89.23 |

570
| | 570a | 570b |
|---|---|---|
| | Cashier_ID | MaxSales-Rows |
| 560a- | 56789 | 810.25, 510c |
| 560b- | 12345 | 345.67, 510g |
| 560c- | 56789 | 543.21, 510h |
| 560d- | 34343 | 89.23, 510i |

OPTIMIZING PROCESSING OF GROUP-BY QUERIES FEATURING MAXIMUM OR MINIMUM EQUALITY CONDITIONS IN A PARALLEL PROCESSING SYSTEM

CROSS-REFERENCE TO RELATED U.S. PATENT APPLICATIONS

This application is a Continuation in Part of and takes priority from (i) U.S. patent application Ser. No. 12/332,602, entitled "SYSTEM, METHOD, AND COMPUTER-READABLE MEDIUM FOR OPTIMIZING PROCESSING OF QUERIES FEATURING MAXIMUM OR MINIMUM EQUALITY CONDITIONS IN A PARALLEL PROCESSING SYSTEM," by Yu Xu et al., filed on Dec. 11, 2008 now U.S. Pat. No. 8,234,292, which is hereby incorporated by reference herein in its entirety and for all purposes.

This application is also a Continuation of (ii) U.S. patent application Ser. No. 12/491,312, entitled "SYSTEM, METHOD, AND COMPUTER-READABLE MEDIUM FOR OPTIMIZING PROCESSING OF QUERIES FEATURING MAXIMUM OR MINIMUM EQUALITY CONDITIONS IN A PARALLEL PROCESSING SYSTEM," by Yu Xu., filed on Jun. 25, 2009 now abandoned.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, as determined by an optimizer. The response time is the amount of time it takes to complete the execution of a query on a given system.

In contemporary parallel processing systems in which rows of tables are distributed across multiple processing modules, queries featuring maximum or minimum equality conditions require a table to be read twice to process the query when there is no index on the attribute on which the maximum or minimum equality condition is applied. The system first scans the table to compute the maximum or minimum attribute value, and then the maximum or minimum attribute value is broadcast to every processing module. The system then scans the table again to find records qualified by the identified maximum or minimum attribute value. In systems that feature large tables, the requisite resources consumed for processing such a query often become disadvantageously extensive.

SUMMARY

Disclosed embodiments provide a system, method, and computer readable medium that facilitates optimized processing of a query specifying an equality condition on an attribute of a table in a parallel processing system. The system includes at least one storage facility on which a database table is stored, and a plurality of processing modules each allocated a respective subset of rows of the table. A processing module of the plurality of processing modules receives the query, initializes a hash table including a first field for a selected attribute of the query and at least one second field for the attribute on which the equality condition is applied and a row of the subset of rows. The processing module identifies each row of the subset of rows that satisfies the equality condition, stores the selected attribute of each row of the subset of rows identified as satisfying the equality condition in the first field of a respective row of the hash table, and the value of the attribute on which the equality condition is applied and the row identified as satisfying the equality condition in the at least one second field of the respective row of the hash table. The processing module then redistributes each row of the hash table to a respective one of the plurality of processing modules based on a hash value of the selected attribute, and receives a global value of each attribute of the table on which the equality condition is applied that respectively specifies a maximum value of the attribute on which the equality condition is applied for a corresponding selected attribute in the event the equality condition comprises a maximum equality condition and that respectively specifies a minimum value of the attribute on which the equality condition is applied for a corresponding selected attribute in the event the equality condition comprises a minimum equality condition.

When evaluating rows of the subset of rows allocated to the processing module, the processing module may determine the hash table does not include a row having the selected attribute of an evaluated row. In this instance, the processing module inserts a row in the hash table including the selected attribute of the evaluated row in the first field, and the attribute value of the attribute on which the equality condition is applied of the evaluated row and the evaluated row in the at least one second field. When evaluating rows of the subset of rows allocated to the processing module, the processing module may determine the hash table includes a row having the selected attribute of the evaluated row. In this instance, the processing module compares a value of the attribute on which the equality condition is applied of the evaluated row with an attribute value of the row of the hash table. If the processing module determines the value of the attribute on which the equality condition is applied of the evaluated row exceeds the attribute value of the row of the hash table in the event the equality condition comprises a maximum equality condition or is less than the attribute value of the row of the hash table in the event the equality condition comprises a minimum equality condition, the processing module replaces the value of the attribute in the row of the hash table with the value of the attribute on which the equality condition is applied from the evaluated row, and replaces the row stored in the hash table with the currently evaluated row. Upon receipt of the global values, the processing module compares each global value of each attribute with a value of the attribute on which the equality condition is applied of a corresponding selected attribute stored in the hash table, and discards a row of the hash table in the event the value of the attribute of the row of the hash table is less than the global value for the selected attribute in the event the equality condition comprises a maximum equality condition or in the event the value of the attribute of the row of the hash table is greater than the global value for the selected attribute if the equality condition comprises a minimum equality condition. Rows of the hash table are maintained for inclusion in the final query result if the attribute value of the row of the hash table on which the equality condition is applied equals the global value for the selected attribute.

BRIEF DESCRIPTION OF THE DRAWINGS

Aspects of the present disclosure are best understood from the following detailed description when read with the accompanying figures, in which:

FIG. 5A is a diagrammatic representation of a portion of an exemplary table on which mechanisms for optimizing processing of group-by queries that feature maximum or minimum equality conditions may be implemented in accordance with disclosed embodiments;

FIG. 5B is a diagrammatic representation of a portion of an exemplary hash table on which mechanisms for optimizing processing of group-by queries that feature maximum or minimum equality conditions may be implemented in accordance with disclosed embodiments;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, mechanisms for processing group-by queries that feature maximum or minimum equality conditions are provided in which a table on which the query is applied is scanned a single time.

Figure 1:
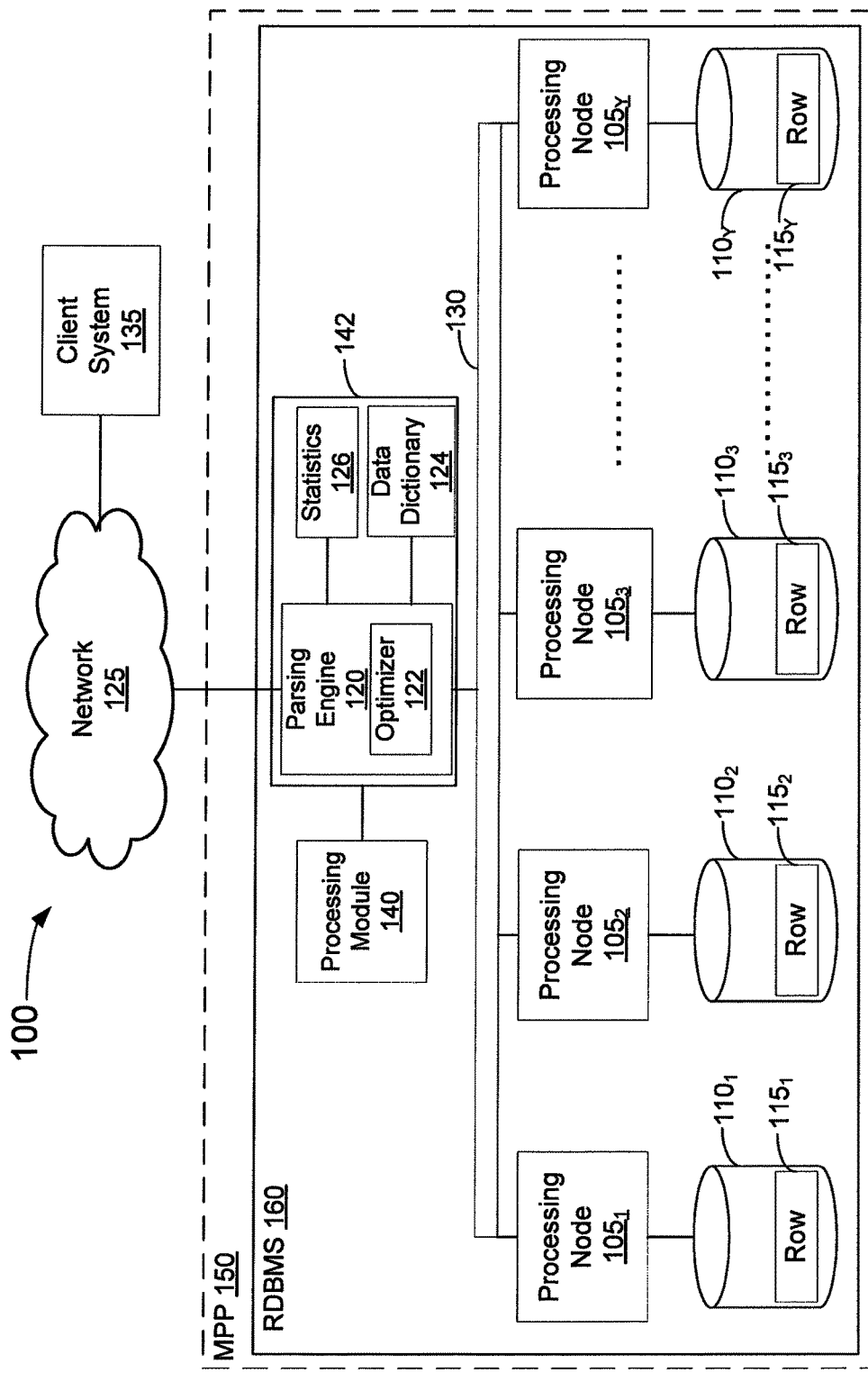
FIG. 1 depicts a diagrammatic representation of an exemplary architecture for a large database system that is suited for implementing mechanisms for optimizing processing of group-by queries that feature maximum or minimum equality conditions in accordance with disclosed embodiments.

FIG. 1 depicts a diagrammatic representation of an exemplary architecture for a large database system 100, such as a Teradata Active Data Warehousing System, that is suited for implementing mechanisms for optimizing processing of group-by queries that feature maximum or minimum equality conditions in accordance with disclosed embodiments. The database system 100 includes a relational database management system (RDBMS) 160 built upon a massively parallel processing (MPP) system 150.

As shown, the database system 100 includes one or more processing nodes $105_1 \ldots _Y$ that manage the storage and retrieval of data in data-storage facilities $110_1 \ldots _Y$. Each of the processing nodes may host one or more physical or virtual processing modules, such as one or more access module processors (AMPs). Each of the processing nodes $105_1 \ldots _Y$ manages a portion of a database that is stored in a corresponding one of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Y$ of the tables are stored across multiple data-storage facilities $110_1 \ldots _Y$ to ensure that the system workload is distributed evenly across the processing nodes $105_1 \ldots _Y$. A parsing engine 120 organizes the storage of data and the distribution of table rows $115_1 \ldots _Y$ among the processing nodes $105_1 \ldots _Y$ and accesses processing nodes $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_1 \ldots _Y$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The optimizer may utilize statistics 126 for making query assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI). The parsing engine 120, the data dictionary 124, and the statistics 126 may be implemented as computer-executable instruction sets tangibly embodied on a computer-readable medium, such as a memory device 142, that are retrieved by a processing module 140 and processed thereby.

Figure 2:
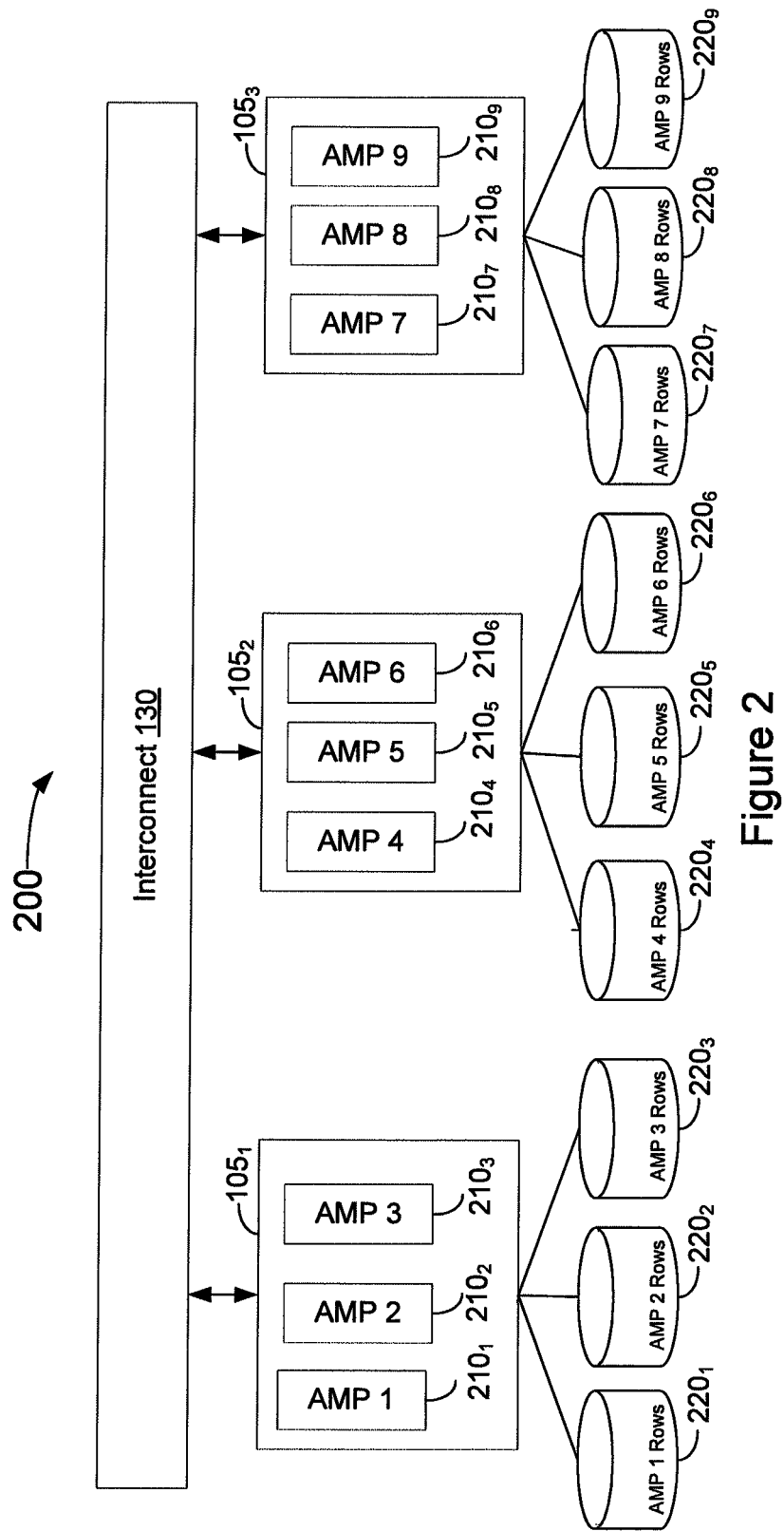
FIG. 2 is a diagrammatic representation of a massively parallel processing system configuration suitable for implementing mechanisms for optimizing processing of group-by queries that feature maximum or minimum equality conditions in accordance with disclosed embodiments.

FIG. 2 is a diagrammatic representation of an MPP configuration 200 suitable for implementing mechanisms for optimizing processing of group-by queries that feature maximum or minimum equality conditions in accordance with disclosed embodiments. In the illustrative example, each of the processing nodes $105_1$-$105_3$ are each configured with three respective AMPs $210_1$-$210_9$. The rows $115_1 \ldots _Y$ depicted in FIG. 1 of tables have been distributed across the nine AMPs $210_1$-$210_9$ hosted by processing nodes $105_1$-$105_3$ such that each of the AMPs is allocated rows $220_1$-$220_9$. For example, the rows $115_1 \ldots _Y$ may be distributed or partitioned across the data-storage facilities $110_1 \ldots _Y$ by the parsing engine 120 in accordance with their primary index. The primary index defines the columns of the rows that are used for calculating a hash value. A hash function produces hash values from the values in the columns specified by the primary index. Some portion, possibly the entirety, of the hash value is designated a "hash bucket". The hash buckets are assigned to data-storage facilities $110_1 \ldots {}_Y$ and associated processing modules, such as AMPs $210_1 \ldots {}_9$, by a hash bucket map. The characteristics of the columns chosen for the primary index determine how evenly the rows are distributed.

Figure 3:
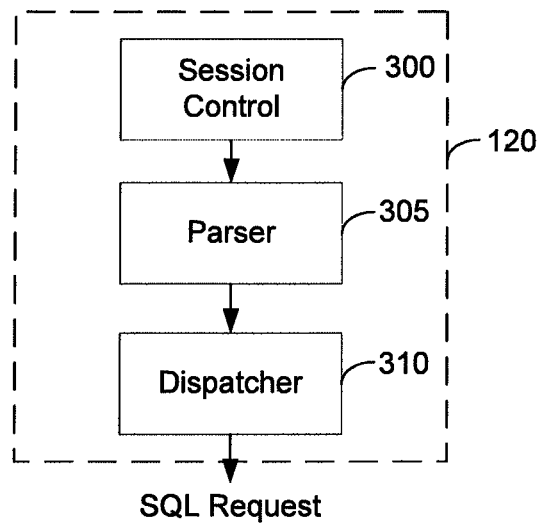
FIG. 3 is a diagrammatic representation of a parsing engine implemented in accordance with an embodiment.
Figure 4:
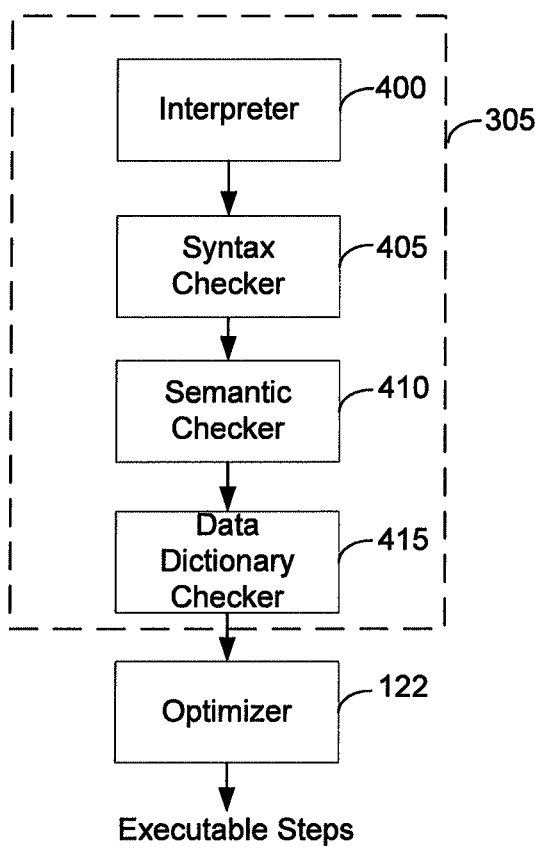
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 depicted in FIG. 1 to ensure that all of the objects specified in the SQL request exist and that the user has the authority to perform the request (block 415). Finally, the parser 305 runs the optimizer 122 that selects the least expensive plan to perform the request.

FIG. 5A is a diagrammatic representation of a portion of an exemplary table 500 on which mechanisms for optimizing processing of group-by queries that feature maximum or minimum equality conditions may be implemented in accordance with disclosed embodiments. Table 500 comprises a plurality of records 510a-510i (collectively referred to as records 510) and fields 520a-520c (collectively referred to as fields 520). Each record 510 comprises data elements in respective fields, or attributes, 520. In the present example, table 500 has a table name "Transactions" and includes fields 520 having respective labels of "Cashier_ID", "Transaction_ID", and "Sales_Amount".

Consider an exemplary query for identifying the highest sales amount for each cashier in the table Transactions:

Select T1.*
From transactions T1,
(
Select cashier_id, max(sales_amount) AS MaxSales from transactions
Group by cashier_id
) T2
Where T1.casher_id=T2.casher_id and T1.sales_amount = T2.MaxSales Assume for illustrative purposes that the Transaction_ID field is the primary key and primary index for the depicted table. In the illustrative example, the inner group-by subquery computes the highest sales amount for each cashier and the outer query joins the transactions table with the derived table produced by the inner group-by subquery to find all highest sales rows for each cashier.

Contemporary MPP systems read the table twice to execute a query similar to that depicted above. The system first scans the table to compute the highest sales amount for each cashier for the inner group-by subquery, and then the derived table is broadcast to every AMP, or other processing node, to join with the transactions table assuming that the statistics show that the transactions table is far larger than the derived table. The system then scans the table again to join the base table with the derived table to find qualified rows for each cashier.

In accordance with disclosed embodiments, mechanisms for computing queries similar to that depicted above are provided that require a single-scan of the table on which the group-by query is applied. When the table is scanned, each AMP dynamically keeps track of the row(s) having a value of the attribute on which the equality condition is applied that equals or exceeds the maximum amount (assuming a maximum equality condition is applied) previously encountered by the AMP. Subsequently, a global aggregation process is then performed to compute the query's result without rescanning the table.

Figure 6:
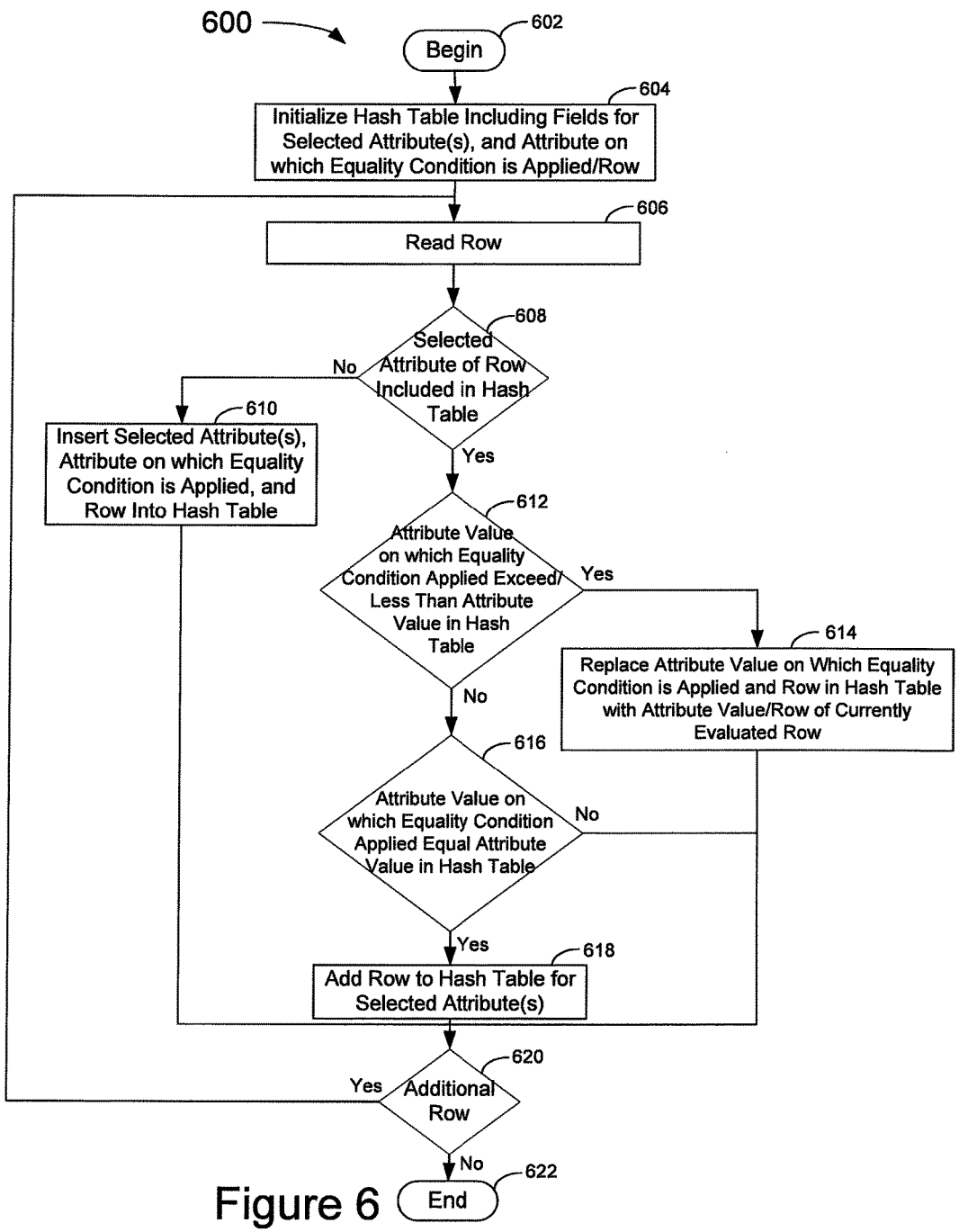
FIG. 6 is a flowchart that depicts processing of a local aggregation routine that facilitates optimization of the execution of group-by queries featuring a maximum or minimum equality in accordance with an embodiment.

FIG. 6 is a flowchart 600 that depicts processing of a local aggregation routine that facilitates optimization of the execution of group-by queries featuring a maximum or minimum equality in accordance with an embodiment. The processing steps of FIG. 6 may be implemented as computer-executable instructions tangibly embodied on a computer-readable medium executable by a processing system, such as one or more of the AMPs $210_1$-$210_9$ depicted in FIG. 2.

The local aggregation routine is invoked (step 602), e.g., upon receipt of a group-by query featuring a maximum or minimum equality condition. The AMP then initializes a hash table that preferably includes a field for the selected attribute(s) and a field for the attribute on which the equality condition is applied and one or more rows (step 604). For instance, FIG. 5B is a diagrammatic representation of a portion of an exemplary hash table 550 on which mechanisms for optimizing processing of group-by queries that feature maximum or minimum equality conditions may be implemented in accordance with disclosed embodiments. Table 550 includes fields 570a-570b (collectively referred to as fields 570). In the present example, table 550 includes fields 570 having respective labels of "Cashier_ID" and "MaxSales-Rows".

A first row allocated to the AMP is then read (step 606), and an evaluation is then made to determine if the selected attribute(s) of the query is included in the hash table (step 608). If not, the AMP then adds a row to the hash table including the selected attribute(s), the value of the attribute on which the equality condition is applied and the corresponding currently evaluated row (step 610). For example, assume that a particular AMP is allocated each of the rows of Table 500 depicted in FIG. 5A. Further assume that the AMP first evaluates row 510a of Table 500 according to step 606 and 608. In the event that the selected attribute(s), e.g., Cashier_ID, of the query is not included in the hash table 550, the AMP then inserts the Cashier_ID ("56789") of the currently evaluated row into field 570a of a row of the hash table, e.g., row 560a, and inserts the attribute value of the currently evaluated row 510a on which the equality condition is applied along with a copy of the row into the hash table field 570b of row 560a. The attribute value and row inserted into field 570b may, for example, be added to the hash table as comma separated delimiter values. An evaluation is then made to determine if an additional row remains for evaluation (step 620).

Returning again to step 608, if the selected attribute(s) is included in the hash table, the AMP then evaluates whether the value of the attribute on which the equality condition is applied of the currently evaluated row exceeds (in the case the equality condition comprises a maximum equality condition) or is less than (in the case the equality condition comprises a minimum equality condition) the value corresponding to the selected attribute in the hash table (step 612). If so, the AMP then replaces the value of the attribute on which the equality condition is applied and the row in the hash table with the value of the attribute on which the equality condition is applied from the currently evaluated row along with the currently evaluated row (step 614). For example, assume the AMP has proceeded to evaluate row 510c of table 500 and that the attribute value of the Max-Sales-Rows field of the hash table 550 corresponding to the selected attribute is "127.34". Further assume the equality condition applied to the Sales_Amount attribute of the query comprises a maximum equality condition. In this instance, the attribute value ("810.25") of the currently evaluated row exceeds the attribute value currently stored in the hash table. Accordingly, the AMP would then replace the currently stored attribute value on which the equality condition is applied and the corresponding row of field 570b with the attribute value on which the equality condition is applied of the currently evaluated row and the corresponding row into field 570b of the hash table. The local aggregation routine may then proceed to evaluate whether any additional rows remain for evaluation according to step 620.

Returning again to step 612, in the event the value of the attribute of the currently evaluated row does not exceed (in the case the equality condition is a maximum equality condition) or is not less than (in the case the equality condition is a minimum equality condition) the value of the attribute in the hash table, the AMP may then evaluate whether the value of the attribute of the currently evaluated row equals the value of the attribute stored in the hash table (step 616). If not, the AMP may proceed to determine whether an additional row remains for evaluation according to step 620. If the attribute vale of the currently evaluated row equals the value of the attribute stored in the hash table, the AMP then adds the row to the hash table in association with the corresponding attribute value (step 618). The AMP may then determine whether any additional rows remain for evaluation according to step 620. If an additional row remains, the AMP return to step 606 to read the next row. When no additional rows remain for evaluation, the local aggregation routine cycle may then end (step 622). In this manner, when all rows have been evaluated, the hash table 550 stores the local maximum attribute value and corresponding row(s) (in the case the equality condition is a maximum equality condition) or the minimum attribute value and corresponding row(s) (in the case the equality condition is a minimum equality condition) for each selected attribute in rows 560a-560d of the hash table.

Figure 7:
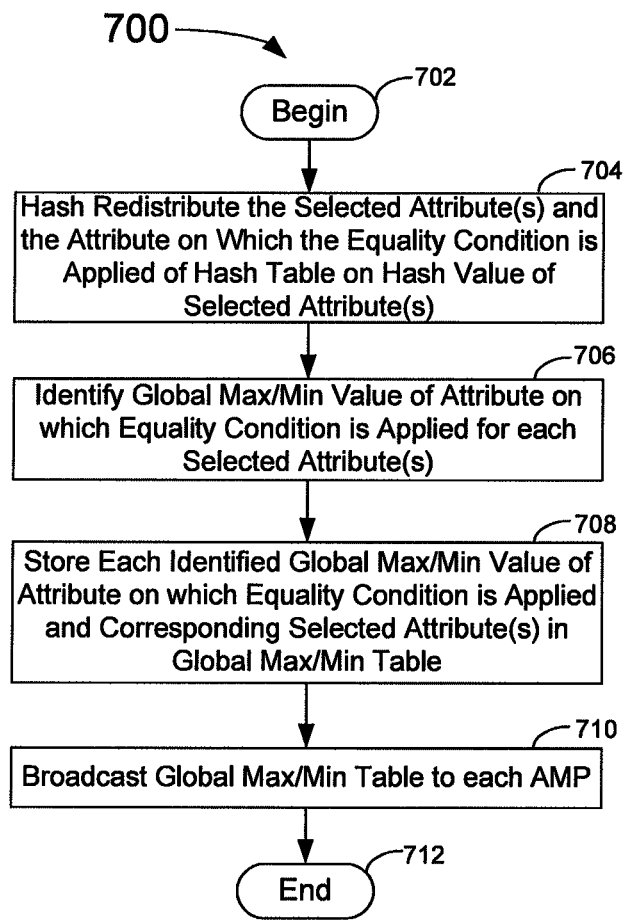
FIG. 7 is a flowchart that depicts processing of a global aggregation routine that facilitates optimization of the execution of group-by queries featuring a maximum or minimum equality condition in accordance with an embodiment.

FIG. 7 is a flowchart 700 that depicts processing of a global aggregation routine that facilitates optimization of the execution of group-by queries featuring a maximum or minimum equality condition in accordance with an embodiment. The processing steps of FIG. 7 may be implemented as computer-executable instructions tangibly embodied on a computer-readable medium executable by a processing system, such as one or more of the AMPs $210_1$-$210_9$ depicted in FIG. 2.

The global aggregation routine is invoked (step 702), e.g., upon completion of the local aggregation routine described with reference to FIG. 6, and the AMP hash redistributes the selected attribute(s) and the attribute on which the equality condition is applied on the hash value of the selected attribute(s) (step 704). On receipt of hash redistributed values, an AMP may then determine the global maximum value (in the case the equality condition is a maximum equality condition) or global minimum value (in the case the equality condition is a minimum equality condition) of the attribute on which the equality condition is applied for each selected attribute(s) (step 706). Each global maximum value (in the case the equality condition is a maximum equality condition) or global minimum value (in the case the equality condition is a minimum equality condition) of the attribute on which the equality condition is applied is then stored along with the corresponding selected attribute(s) in a global maximum table (in the case the equality condition is a maximum equality condition) or global minimum table (in the case the equality condition is a minimum equality condition) (step 708). When all rows hash redistributed to an AMP have been evaluated, the AMP then broadcasts the rows of the global maximum (or minimum) table to each of the AMPs (step 710). The global aggregation routine cycle may then end (step 712).

Figure 8:
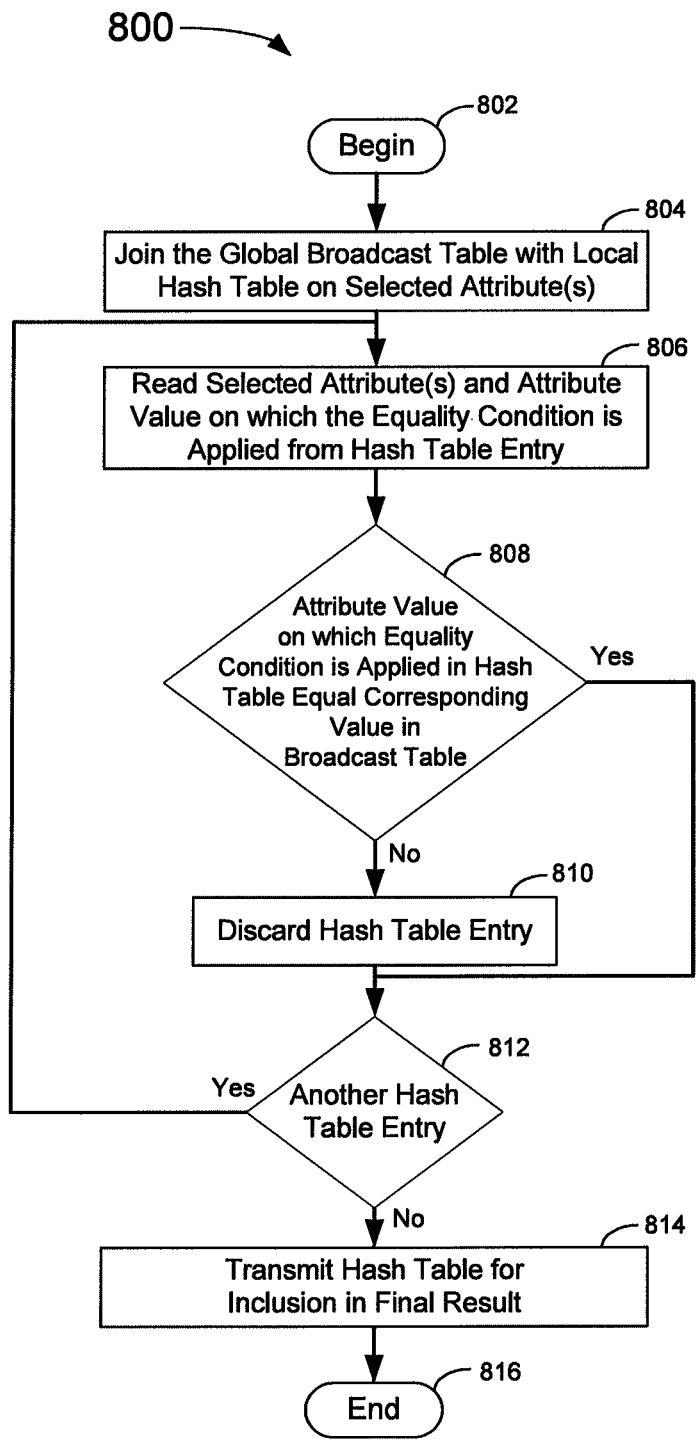
FIG. 8 is a flowchart that depicts processing of a final computation routine that facilitates optimization of the execution of group-by queries featuring a maximum or minimum equality in accordance with an embodiment.

FIG. 8 is a flowchart 800 that depicts processing of a final computation routine that facilitates optimization of the execution of group-by queries featuring a maximum or minimum equality in accordance with an embodiment. The processing steps of FIG. 8 may be implemented as computer-executable instructions tangibly embodied on a computer-readable medium executable by a processing system, such as one or more of the AMPs $210_1$-$210_9$ depicted in FIG. 2.

The routine is invoked (step 802), and an AMP joins the table globally broadcast thereto with the local hash table of the AMP on the selected attribute(s) (step 804). The AMP then reads a selected attribute(s) and corresponding attribute value on which the maximum or minimum equality condition is applied (step 806). An evaluation is then made to determine if the attribute value on which the equality condition is applied in the hash table is equal to the corresponding value in the broadcast table (step 808). If the attribute value on which the equality condition is applied in the hash table equals the corresponding value in the broadcast table, the AMP then proceeds to determine whether an additional hash table entry remains for evaluation (step 812). If the attribute value on which the equality condition is applied in the hash table does not equal the corresponding value in the broadcast table, the AMP discards the corresponding hash table entry (step 810), and then determines if an additional hash table entry remains for evaluation according to step 812. When no additional hash table entries remain for evaluation, the AMP then transmits the hash table to a central node for inclusion in the query final result (step 814). The final computation routine cycle may then end (step 816).

As described, mechanisms that facilitate optimized processing of a query specifying an equality condition on an attribute of a table in a parallel processing system are provided. The system includes at least one storage facility on which a database table is stored, and a plurality of processing modules each allocated a respective subset of rows of the table. A processing module of the plurality of processing modules receives the query, initializes a hash table including a first field for a selected attribute of the query and at least one second field for the attribute on which the equality condition is applied and a row of the subset of rows. The processing module identifies each row of the subset of rows that satisfies the equality condition, stores the selected attribute of each row of the subset of rows identified as satisfying the equality condition in the first field of a respective row of the hash table, and the value of the attribute on which the equality condition is applied and the row identified as satisfying the equality condition in the at least one second field of the respective row of the hash table. The processing module then redistributes each row of the hash table to a respective one of the plurality of processing modules based on a hash value of the selected attribute, and receives a global value of each attribute of the table on which the equality condition is applied that respectively specifies a maximum value of the attribute on which the equality condition is applied for a corresponding selected attribute in the event the equality condition comprises a maximum equality condition and that respectively specifies a minimum value of the attribute on which the equality condition is applied for a corresponding selected attribute in the event the equality condition comprises a minimum equality condition.

When evaluating rows of the subset of rows allocated to the processing module, the processing module may determine the hash table does not include a row having the selected attribute of an evaluated row. In this instance, the processing module inserts a row in the hash table including the selected attribute of the evaluated row in the first field, and the attribute value of the attribute on which the equality condition is applied of the evaluated row and the evaluated row in the at least one second field. When evaluating rows of the subset of rows allocated to the processing module, the processing module may determine the hash table includes a row having the selected attribute of the evaluated row. In this instance, the processing module compares a value of the attribute on which the equality condition is applied of the evaluated row with an attribute value of the row of the hash table. If the processing module determines the value of the attribute on which the equality condition is applied of the evaluated row exceeds the attribute value of the row of the hash table in the event the equality condition comprises a maximum equality condition or is less than the attribute value of the row of the hash table in the event the equality condition comprises a minimum equality condition, the processing module replaces the value of the attribute in the row of the hash table with the value of the attribute on which the equality condition is applied from the evaluated row, and replaces the row stored in the hash table with the currently evaluated row. Upon receipt of the global values, the processing module compares each global value of each attribute with a value of the attribute on which the equality condition is applied of a corresponding selected attribute stored in the hash table, and discards a row of the hash table in the event the value of the attribute of the row of the hash table is less than the global value for the selected attribute in the event the equality condition comprises a maximum equality condition or in the event the value of the attribute of the row of the hash table is greater than the global value for the selected attribute if the equality condition comprises a minimum equality condition. Rows of the hash table are maintained for inclusion in the final query result if the attribute value of the row of the hash table on which the equality condition is applied equals the global value for the selected attribute.

The flowcharts of FIGS. 6-8 depict process serialization to facilitate an understanding of disclosed embodiments and are not necessarily indicative of the serialization of the operations being performed. In various embodiments, the processing steps described in FIGS. 6-8 may be performed in varying order, and one or more depicted steps may be performed in parallel with other steps. Additionally, execution of some processing steps of FIGS. 6-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of optimizing processing of a query specifying an equality condition on an attribute of a table in a parallel processing system, comprising:

receiving, by a processing module of a plurality of processing modules deployed in the parallel processing system, the query that specifies the equality condition on the attribute of the table, wherein the processing module has a subset of rows of the table allocated thereto;

initializing, by the processing module, a hash table including a first field for a selected attribute of the query and at least one second field for the attribute on which the equality condition is applied and a row of the subset of rows;

identifying, by the processing module, each row of the subset of rows that satisfies the equality condition by at least:

evaluating, by the processing module, the selected attribute of each row of the subset of rows; and determining if a row of the hash table includes a row having the selected attribute;

storing, by the processing module, the selected attribute of each row of the subset of rows identified as satisfying the equality condition in the first field of a respective row of the hash table, and the value of attribute on which the equality condition is applied and the row identified as satisfying the equality condition in the at least one second field of the respective row of the hash table;

redistributing each row of the hash table, associated with the equality condition, to a respective one of the plurality of processing modules based on a hash value of the selected attribute;

after the redistributing each row of the hash table based on a hash value of the selected attribute, receiving, by the respective one of the plurality of the processing modules, a global value of each attribute of the table on which the equality condition is applied that respectively specifies a maximum value of the attribute on which the equality condition is applied for a corresponding selected attribute in the event the equality condition comprises a maximum equality condition and that respectively specifies a minimum value of the attribute on which the equality condition is applied for a corresponding selected attribute in the event the equality condition comprises a minimum equality condition;

after the redistributing each row of the hash table based on a hash value of the selected attribute, comparing by the respective one of the plurality of the processing modules each global value of each attribute with a value of the attribute on which the equality condition is applied of a corresponding selected attribute stored in the hash table;

after the redistributing each row of the hash table based on a hash value of the selected attribute, discarding by the respective one of the plurality of the processing modules a row of the hash table in the event the value of the attribute of the row of the hash table is less than the global value for the selected attribute in the event the equality condition comprises a maximum equality condition; and after the redistributing each row of the hash table based on a hash value of the selected attribute, maintaining by the respective one of the plurality of the processing modules a row of the hash table in the event the value of the attribute of the row of the hash table equals the global value for the selected attribute.

2. The method of claim 1, wherein the processing module determines the hash table does not include a row having the selected attribute of an evaluated row, the method further comprising inserting a row in the hash table including the selected attribute of the evaluated row in the first field, and the attribute value of the attribute on which the equality condition is applied of the evaluated row and the evaluated row in the at least one second field.

3. The method of claim 1, wherein the processing module determines the hash table includes a row having the selected attribute of an evaluated row, the method further comprising:
comparing a value of the attribute on which the equality condition is applied of the evaluated row with an attribute value of the row of the hash table;
determining the value of the attribute on which the equality condition is applied of the evaluated row exceeds the attribute value of the row of the hash table in the event the equality condition comprises a maximum equality condition or is less than the attribute value of the row of the hash table in the event the equality condition comprises a minimum equality condition;
replacing the value of the attribute in the row of the hash table with the value of the attribute on which the equality condition is applied from the evaluated row; and
replacing the row stored in the hash table with the currently evaluated row.

4. A non-transitory computer-readable medium storing at least computer-executable instructions for execution by a processing system, the computer-executable instructions for optimizing processing of a query specifying an equality condition on an attribute of a table in a parallel processing system, the computer-executable instructions, when executed, cause the processing system to:
receive, by a processing module of a plurality of processing modules deployed in the parallel processing system, the query, wherein the processing module has a subset of rows of the table allocated thereto;
initialize, by the processing module, a hash table including a first field for a selected attribute of the query and at least one second field for the attribute on which the equality condition is applied and a row of the subset of rows;
identify, by the processing module, each row of the subset of rows that satisfies the equality condition;
store, by the processing module, the selected attribute of each row of the subset of rows identified as satisfying the equality condition in the first field of a respective row of the hash table, and the value of attribute on which the equality condition is applied and the row identified as satisfying the equality condition in the at least one second field of the respective row of the hash table;
redistribute each row of the hash table to a respective one of the plurality of processing modules based on a hash value of the selected attribute; and
receive, by the processing module, a global value of each attribute of the table on which the equality condition is applied that respectively specifies a maximum value of the attribute on which the equality condition is applied for a corresponding selected attribute in the event the equality condition comprises a maximum equality condition and that respectively specifies a minimum value of the attribute on which the equality condition is applied for a corresponding selected attribute in the event the equality condition comprises a minimum equality condition.

5. The non-transitory computer-readable medium of claim 4, wherein the instructions that identify each row of the subset of rows further comprise instructions that, when executed, cause the processing system to:
evaluate, by the processing module, the selected attribute of each row of the subset of rows; and
determine if a row of the hash table includes a row having the selected attribute.

6. The non-transitory computer-readable medium of claim 5, wherein the processing module determines the hash table does not include a row having the selected attribute of an evaluated row, the computer-readable medium further comprising instructions that, when executed, cause the processing system to insert a row in the hash table including the selected attribute of the evaluated row in the first field, and the attribute value of the attribute on which the equality condition is applied of the evaluated row and the evaluated row in the at least one second field.

7. The non-transitory computer-readable medium of claim 5, wherein the processing module determines the hash table includes a row having the selected attribute of an evaluated row, the computer-readable medium further comprising instructions that, when executed, cause the processing system to:
compare a value of the attribute on which the equality condition is applied of the evaluated row with an attribute value of the row of the hash table;
determine the value of the attribute on which the equality condition is applied of the evaluated row exceeds the attribute value of the row of the hash table in the event the equality condition comprises a maximum equality condition or is less than the attribute value of the row of the hash table in the event the equality condition comprises a minimum equality condition;
replace the value of the attribute in the row of the hash table with the value of the attribute on which the equality condition is applied from the evaluated row; and
replace the row stored in the hash table with the currently evaluated row.

8. The non-transitory computer-readable medium of claim 4, further comprising instructions that, when executed, cause the processing system to:
compare each global value of each attribute with a value of the attribute on which the equality condition is applied of a corresponding selected attribute stored in the hash table; and
discard a row of the hash table in the event the value of the attribute of the row of the hash table is less than the global value for the selected attribute in the event the equality condition comprises a maximum equality condition.

9. The non-transitory computer-readable medium of claim 4, further comprising instructions that, when executed, cause the processing system to:
compare each global value of each attribute with a value of the attribute on which the equality condition is applied of a corresponding selected attribute stored in the hash table; and
discard a row of the hash table in the event the value of the attribute of the row of the hash table is greater than the global value for the selected attribute in the event the equality condition comprises a minimum equality condition.

10. The non-transitory computer-readable medium of claim 4, further comprising instructions that, when executed, cause the processing system to:
compare each global value of each attribute with a value of the attribute on which the equality condition is applied of a corresponding selected attribute stored in the hash table; and
maintain a row of the hash table in the event the value of the attribute of the row of the hash table equals the global value for the selected attribute.

11. A parallel processing system configured to optimize processing of a query specifying an equality condition on an attribute of a table in the parallel processing system, comprising:
at least one physical storage facility on which a database table is stored; and
a plurality of processing modules each allocated a respective subset of rows of the table, wherein a processing module of the plurality of processing modules receives the query, initializes a hash table including a first field for a selected attribute of the query and at least one second field for the attribute on which the equality condition is applied and a row of the subset of rows, identifies each row of the subset of rows that satisfies the equality condition, stores the selected attribute of each row of the subset of rows identified as satisfying the equality condition in the first field of a respective row of the hash table, the value of the attribute on which the equality condition is applied and the row identified as satisfying the equality condition in the at least one second field of the respective row of the hash table, redistributes each row of the hash table to a respective one of the plurality of processing modules based on a hash value of the selected attribute, and receives a global value of each attribute of the table on which the equality condition is applied that respectively specifies a maximum value of the attribute on which the equality condition is applied for a corresponding selected attribute in the event the equality condition comprises a maximum equality condition and that respectively specifies a minimum value of the attribute on which the equality condition is applied for a corresponding selected attribute in the event the equality condition comprises a minimum equality condition.

12. The system of claim 11, wherein the processing module identifies each row of the subset of rows by evaluating the selected attribute of each row of the subset of rows, and determines if a row of the hash table includes a row having the selected attribute.

13. The system of claim 12, wherein the processing module determines the hash table does not include a row having the selected attribute of an evaluated row, wherein the processing module inserts a row in the hash table including the selected attribute of the evaluated row in the first field, and the attribute value of the attribute on which the equality condition is applied of the evaluated row and the evaluated row in the at least one second field.

14. The system of claim 12, wherein the processing module determines the hash table includes a row having the selected attribute of an evaluated row, wherein the processing module compares a value of the attribute on which the equality condition is applied of the evaluated row with an attribute value of the row of the hash table and determines the value of the attribute on which the equality condition is applied of the evaluated row exceeds the attribute value of the row of the hash table in the event the equality condition comprises a maximum equality condition or is less than the attribute value of the row of the hash table in the event the equality condition comprises a minimum equality condition, and wherein the processing module further replaces the value of the attribute in the row of the hash table with the value of the attribute on which the equality condition is applied from the evaluated row and replaces the row stored in the hash table with the currently evaluated row.

15. The system of claim 11, wherein the processing module compares each global value of each attribute with a value of the attribute on which the equality condition is applied of a corresponding selected attribute stored in the hash table and discards a row of the hash table in the event the value of the attribute of the row of the hash table is less than the global value for the selected attribute in the event the equality condition comprises a maximum equality condition.

16. The system of claim 11, wherein the processing module compares each global value of each attribute with a value of the attribute on which the equality condition is applied of a corresponding selected attribute stored in the hash table and discards a row of the hash table in the event the value of the attribute of the row of the hash table is greater than the global value for the selected attribute in the event the equality condition comprises a minimum equality condition.

\* \* \* \* \*